United States Patent
Ramb

(10) Patent No.: US 11,131,238 B2
(45) Date of Patent: Sep. 28, 2021

(54) TURBOCHARGER WITH VARIABLE TURBINE GEOMETRY

(71) Applicant: BorgWarner Inc., Auburn Hills, MI (US)

(72) Inventor: Thomas Ramb, Worms (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 16/656,624

(22) Filed: Oct. 18, 2019

(65) Prior Publication Data

US 2020/0123967 A1  Apr. 23, 2020

(30) Foreign Application Priority Data

Oct. 19, 2018  (EP) ..................................... 18201586

(51) Int. Cl.
  *F02B 37/24*  (2006.01)
  *F01D 17/16*  (2006.01)

(52) U.S. Cl.
  CPC ............ *F02B 37/24* (2013.01); *F01D 17/165* (2013.01); *F05D 2220/40* (2013.01); *F05D 2230/10* (2013.01)

(58) Field of Classification Search
  CPC ........ F02B 37/24; F01D 17/165; F01D 9/041; F01D 17/14; F01D 25/16; F05D 2220/40;
  (Continued)

(56) References Cited

U.S. PATENT DOCUMENTS

| 8,992,164 | B2 | 3/2015 | Ramb et al. |
| 2011/0182717 | A1 | 7/2011 | Tries et al. |
| 2013/0051988 | A1* | 2/2013 | Heidingsfelder ..... F01D 17/165 415/148 |

FOREIGN PATENT DOCUMENTS

| EP | 1564380 A1 | 8/2005 |
| WO | 2014081602 A1 | 5/2014 |

OTHER PUBLICATIONS

English language abstract and machine-assisted English translation for EP 1 564 380 extracted from espacenet.com database on Nov. 11, 2019, 6 pages.

* cited by examiner

*Primary Examiner* — Audrey B. Walter
*Assistant Examiner* — Edward Bushard
(74) *Attorney, Agent, or Firm* — Howard & Howard Attorneys PLLC

(57) ABSTRACT

The invention relates to a turbocharger with a variable turbine geometry, comprising a turbine (1, 2, 5, 6, 7, 8, 9) with a turbine rotor (1) which is rotatably mounted in a turbine housing (2); the turbine (1, 2, 5, 6, 7, 8, 9) comprising a blade bearing ring (5) being arranged about a turbine axis (A); wherein the blade bearing ring (5) supports a number of blade shafts (6); wherein adjustable guide blades (7) are arranged at the blade shafts (6) on a front side of the blade bearing ring (5); wherein blade levers (8) are arranged at the blade shafts (6) on a rear side of the blade bearing ring (5); wherein an adjustment ring (9) is arranged coaxially with the blade bearing ring (5) and engages with the blade levers (8), a rotation of the adjustment ring (9) relative to the blade bearing ring (5) providing for an adjustment of the guide blades (7); wherein the adjustment ring (9) comprises at least one axially protruding bearing stop (10), the bearing stop (10) being provided by deformation of the adjustment ring (5).

11 Claims, 2 Drawing Sheets

(58) Field of Classification Search
CPC ............. F05D 2230/10; F05D 2230/20; F05D 2230/54; Y02T 10/12; F02C 6/12
See application file for complete search history.

TURBOCHARGER WITH VARIABLE TURBINE GEOMETRY

FIELD OF THE INVENTION

The invention relates to a turbocharger according to the preamble of claim 1. The invention further relates to a method for manufacturing an adjustment ring for adjusting guide blades of a turbocharger according to claim 8.

BACKGROUND OF THE INVENTION

U.S. Pat. No. 8,992,164 B2 describes a turbocharger for a combustion engine wherein a number of guide blades of a turbine can be tilted about a respective blade shaft during operation of the turbocharger. For adjusting the guide blades, an adjustment ring is rotated relative to a blade bearing ring. The adjustment ring is formed as a planar or two-dimensional structure, wherein an axial support of the adjustment ring is provided by a bayonet-like groove on a circumferential surface of the blade bearing ring.

It is an object of the invention to provide a turbocharger with a variable turbine geometry, wherein a construction of the variable turbine geometry is achieved in a reliable and cost-effective manner. It is a further an object of the invention to provide for a simple and precise manufacturing of the variable turbine geometry.

SUMMARY OF THE INVENTION

For a turbocharger according to the preamble of claim one, this object is achieved by the characterizing part of claim 1. By means of deforming the adjustment ring for providing a bearing stop in the axial direction, a simple and cost-effective measure for the production and arrangement of the adjustment ring is provided. Generally preferred there can be more than one bearing stop provided by deformation.

In particular, the adjustment ring of the invention allows for a more simple design of the blade bearing ring. For example, no complex machining of grooves for a bayonet-type axial abutment of the adjustment ring, as described in U.S. Pat. No. 8,992,164 B2, needs to be formed.

A turbocharger in the sense of the present invention comprises turbochargers for combustion engines, in particular engines for vehicles like cars and/or lorries. Such turbocharger usually comprises a turbine rotor and a compressor, said turbine rotor and compressor being connected by a rotating shaft. A medium like exhaust gas of a combustion engine drives the turbine rotor which transmits mechanical energy via the shaft to the compressor.

In a preferred embodiment of the invention, the bearing stop abuts against a face of one of the blade levers, wherein a plain bearing arrangement is provided for a relative movement of the adjustment ring and the blade lever. This allows for an easy and reliable positioning of the rotatable adjustment ring in the axial direction. The provision of a plain bearing arrangement means that the adjustment ring with its bearing stop or plurality of bearing stops can move relative to the blade levers while changing a positon for adjusting the guide blades. During this movement, the bearing stops keep in sliding contact with a flat surface of a respective blade lever, hence defining a constant axial position of the adjustment ring. The surface flatness and the materials of the bearing stops and the blade levers are chosen according to this plain bearing requirement.

In order to reduce manufacturing costs, the adjustment ring can preferably be manufactured from a sheet of metal. Such simple sheets provide a very good flatness and parallel surfaces. The material is preferably selected from high-alloyed and heat resistant steels, as the turbine side of the turbocharger gets very hot during operation.

In a preferred embodiment of the invention, the bearing stops are formed as an axially directed deformation of a bridge, the bridge being provided at the adjustment ring by means of removing material. Even more preferred, the bridge is deformed in a V-shaped or U-shaped manner. Such deformation of a bridge or web introduces minimum stress or unwanted deformation into neighboured areas of the adjustment ring. The diameter or cross-section of the bridge can easily be designed in order to provide for sufficient bearing forces whilst keeping deformation forces as low as possible.

Generally preferred, the adjustment ring is supported in openings with a closed rim by means of the lever heads of the blade levers. In particular, the openings can be manufactured by means of fine blanking. This allows for a simple and yet precise forming of a support for the blade levers. As the blade levers interact with circumferentially facing sidewalls of the opening, these sidewalls should be provided as smooth and frictionless, which is helped by the fine blanking. The method of fine blanking is well known in the arts and utilizes counterpunches in order to minimize material deformation in a punching step. A bridge as mentioned further above, which is formed into the bearing stop, is most preferably provided as a portion of the closed rim of the opening.

In an even more preferred detail of such embodiment, the axially protruding bearing stop is provided as a deformation of a portion of the closed rim of the opening. This allows for a simple and slim design as well as an easy manufacturing of the adjustment ring.

The object of the invention is further achieved by a method for manufacturing an adjustment ring for adjusting guide blades of a turbocharger with a variable turbine geometry, comprising the steps of
   a. providing a piece of sheet metal;
   b. removing material from the sheet metal, preferably by means of fine blanking, in order to provide a planar intermediate with a number of openings with a closed rim;
   c. deforming a portion of the intermediate in a direction perpendicular to a plane of the intermediate in order to provide for an axially protruding bearing stop.

Preferably, the turbocharger is an inventive turbocharger as described above.

Advantageously, steps b and step c are performed on the same tool, preferably in one clamping operation. This enhances the throughput and reduces failures.

Performing the steps in one clamping operation means that the workpiece is continuously held by some clamping device, hence keeping a defined position of the workpiece.

Generally preferred, steps b and c are performed one after the other in the same tool. In a first, most preferred variant, a first stage of the tool provides for step b. Then the resulting intermediate is being moved to a second stage, or alternatively a different part of the tool is moved towards the intermediate, preferably in one clamping operation. Then the deforming of the part of the intermediate, e.g. a bridge of the closed rim, is performed in the second stage.

In a second variant, steps b and c could also be provided in one single stage in the way that a punch first removes material of the sheet, forming the intermediate. Then the punch is moved further and a following cam deforms the portion of the intermediate into the bearing stop.

Further advantages and features of the invention can be derived from the detailed embodiment described hereinafter and from the dependent claims.

A preferred embodiment of the invention is described below and is further explained by the drawings.

SHORT DESCRIPTION OF THE DRAWINGS

DETAILED DESCRIPTION

Figure 1:
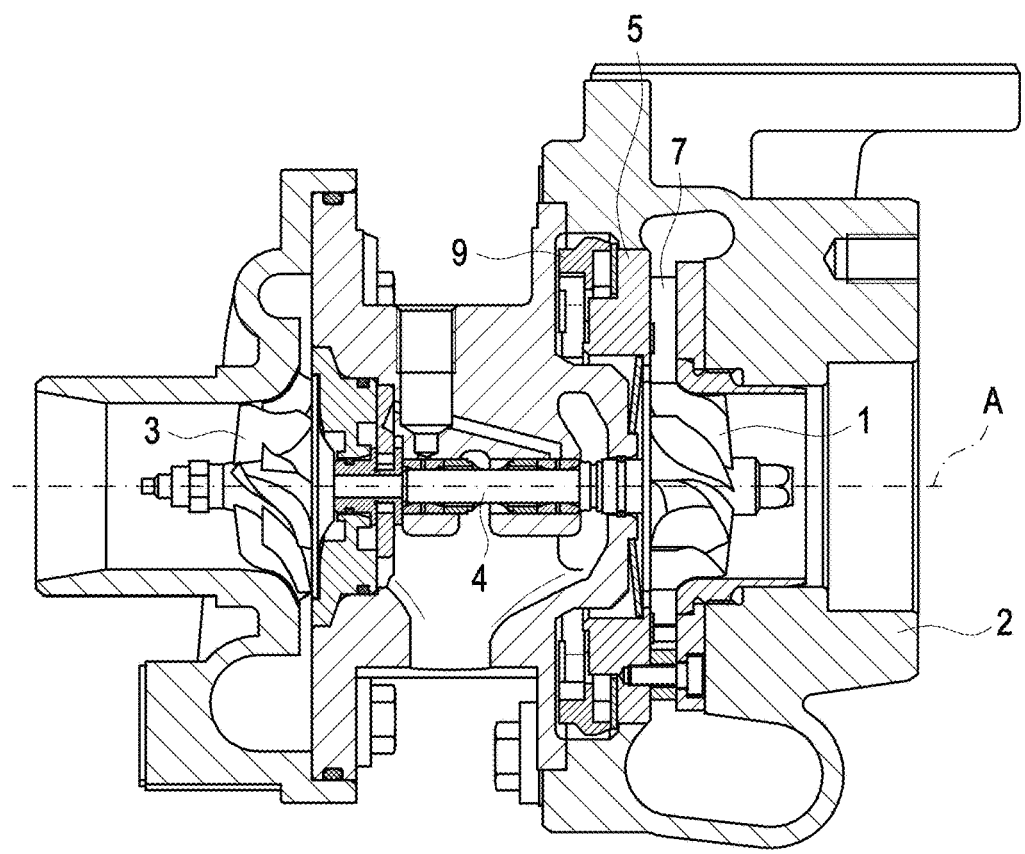
FIG. 1 shows a general schematic view of a turbocharger for a combustion engine with a variable turbine geometry.

The turbocharger displayed in FIG. 1 is a turbocharger for a combustion engine with a variable turbine geomertry (VTG). It comprises a turbine with a turbine rotor 1 being rotatably mounted in a turbine housing 2. The turbine rotor 1 can rotate about a central turbine axis A and is connected to a compressor device 3 by a rotating shaft 4. Exhaust gas of the combustion engine drives the turbine rotor 1, which transmits mechanical energy via the shaft 4 to the compressor 3.

The turbine further comprises a number of guide blades 7 which are adjustable, meaning they can be swivelled about a respective axis parallel to the turbine axis A. By this adjustment, the guide blades 7 provide for a variable turbine geometry.

Figure 2:
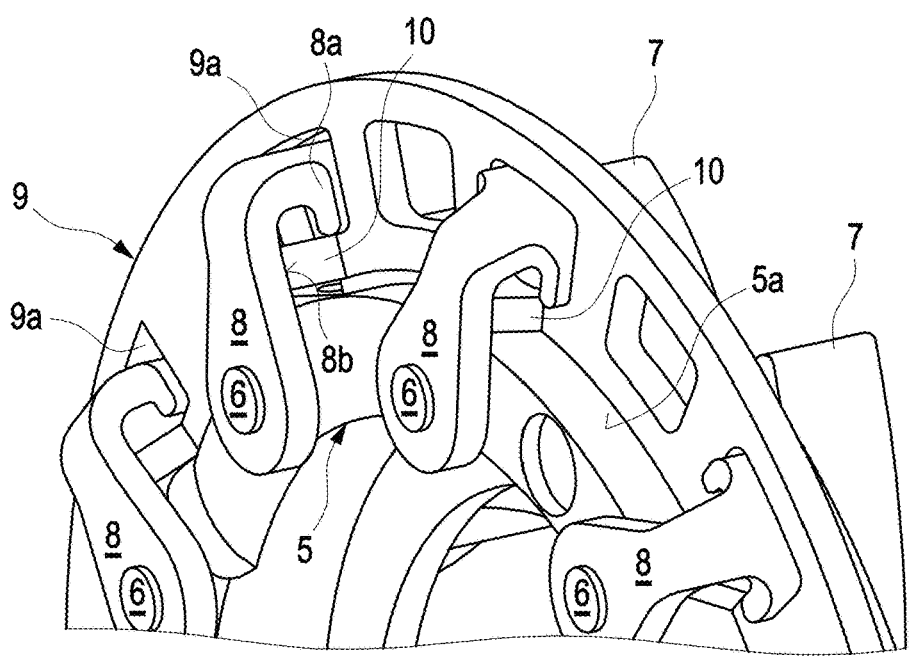
FIG. 2 shows a partial spatial view of an adjustment arrangement for a variable turbine geometry of a turbocharger according to the invention.
Figure 3:
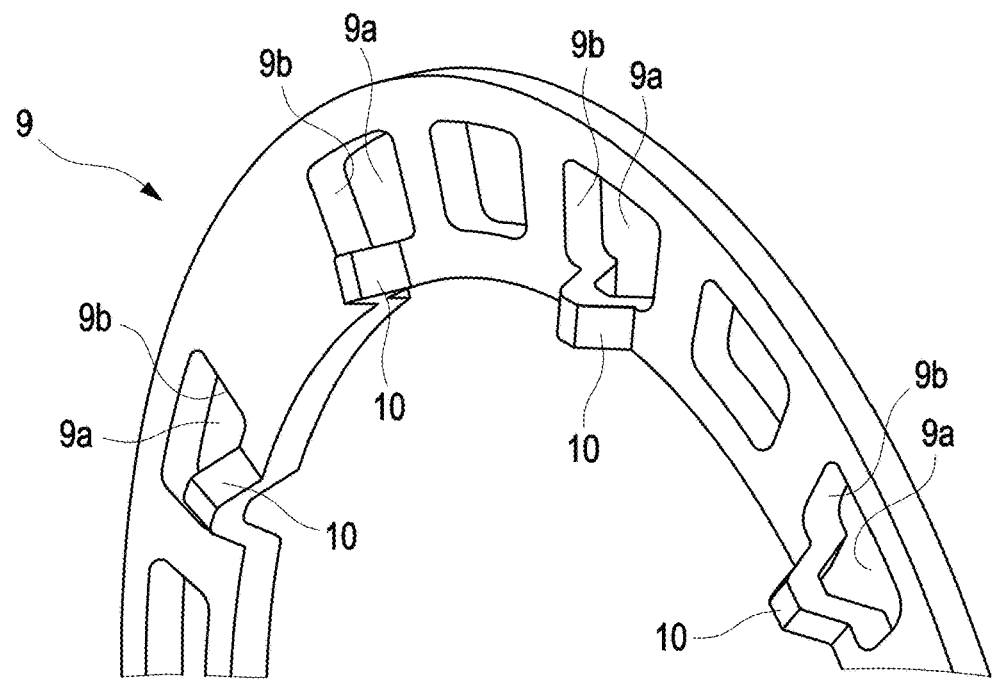
FIG. 3 shows a partial spatial view of an adjustment ring from FIG. 2.
Figure 4:
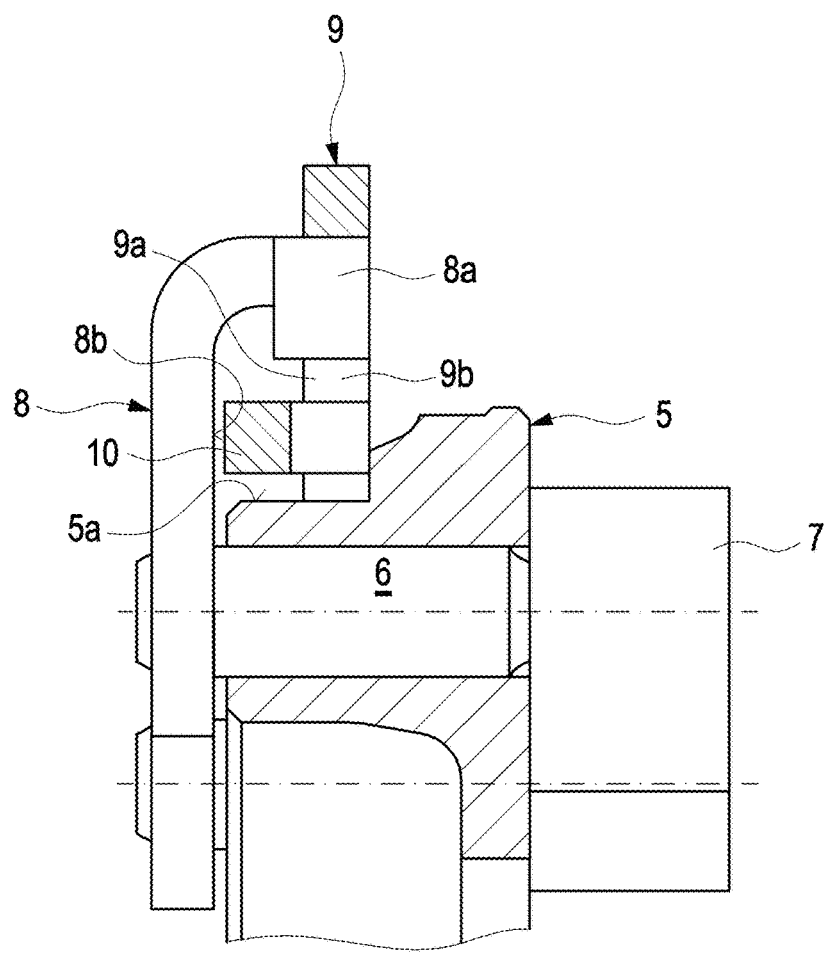
FIG. 4 shows a partial sectional view of the adjustment arrangement of FIG. 2

The turbine, as shown in greater detail in FIG. 2, FIG. 3 and FIG. 4, comprises a blade bearing ring 5, which is arranged about the turbine axis A. The blade bearing ring 5 supports a number of blade shafts 6. The blade shafts 6 protrude through bores of the blade bearing ring 5 and are each oriented parallel to the turbine axis A.

One adjustable guide blade 7 is arranged at each of the blade shafts 6 on a front side of the blade bearing ring 5. A blade lever 8 is arranged at each of the blade shafts 6 on a rear side of the blade bearing ring 5. The blade shafts 6 protrude through the blade bearing ring and connect the guide blades 7 with the blade levers 8, a swivelling movement of a blade lever 8 accordingly forcing an adjustment or swivelling of the respective guide blade 7 about the axis of the blade shaft 6.

An adjustment ring 9 is arranged coaxially with the blade bearing ring 5. The adjustment ring 9 is arranged on a cylindrical surface 5a of the blade bearing ring 5 and can be rotated relative to the blade bearing ring 5. The adjustment ring 9 engages with the blade levers 8, a rotation of the adjustment ring relative to the blade bearing ring providing for an adjustment of the guide blades.

The engaging of the blade levers 8 with the adjustment ring 9 is provided by cranked lever heads 8a of the blade levers 8, the cranked lever heads 8a protruding axially through respective openings 9a of the adjustment ring 9 whereby a radial support of the adjustment ring 9 is achieved. The blade levers 8 are manufactured from pieces of sheet metal, and the lever heads 8a are formed by bending of the sheet metal.

The adjustment ring 9 further comprises axially protruding bearing stops 10, the bearing stops 10 being provided by deformation of the adjustment ring 9.

Each of the bearing stops 10 abuts against a face 8b of a respective one of the blade levers 8, wherein a plain bearing arrangement is provided for a relative movement of the adjustment ring 9 and the blade lever 8. This allows for an easy and reliable positioning of the rotatable adjustment ring 9 in the axial direction. The provision of a plain bearing arrangement means that the adjustment ring 9 with its bearing stops 10 can move relative to the blade levers 8 while changing a positon for adjusting the guide blades 7. During this movement, the bearing stops 10 keep in sliding contact with the flat surface 8b of the respective blade lever 8, hence defining a constant axial position of the adjustment ring 9. The surface flatness and the materials of the bearing stops 10 and the blade levers 8 are chosen according to this plain bearing requirement. In each case, the materials are chosen from high-alloyed and heat resistant steels, as the turbine side of the turbocharger gets very hot during operation.

The adjustment ring 9 (see FIG. 3) is manufactured from a sheet of metal. Such simple sheets usually provide a very good flatness and parallel surfaces. The bearing stops 10 are formed as an axially directed deformation of bridges of the sheet metal of the adjustment ring. Such bridge, which is deformed into the bearing stop 10, is provided as a portion of a closed rim of one of the openings 9a.

The bridge, as a precursor of the bearing stop, is provided at the adjustment ring 9 by means of removing material from the sheet metal. The bridge is deformed in a V-shaped or U-shaped manner. Such deformation of a bridge or web introduces minimum stress or unwanted deformation into neighboured areas of the adjustment ring 9. The diameter or cross-section of the bridge is designed in order to provide for sufficient bearing forces whilst keeping deformation forces as low as possible.

The adjustment ring 9 is supported at blade levers 8, by means of the lever heads 8a in the respective openings 9a. Each of the openings 9a is defined by a closed rim, such that the openings 9a are formed as holes which fully extend through the adjustment ring 9 in axial direction. A part of the closed rim is also a rim of the bridge (before deformation) or bearing stop (after deformation). Hence the axially protruding bearing stop 10 is provided as a deformation of a portion of the closed rim of the opening 9a. In the shown embodiment, the bridge or bearing stop is located at a radially most inward part of the openings 9a of the adjustment ring 9.

The openings 9a are manufactured by means of fine blanking. This allows for a simple and yet precise forming of a support for the adjustment ring 9. As the blade levers 8 interact with circumferentially facing sidewalls 9b of the openings, these sidewalls are provided as smooth and frictionless, which is helped by the fine blanking. The method of fine blanking is well known in the arts and utilizes counterpunches in order to minimize material deformation in a punching step.

The assembly of the guide blades 7, the blade bearing ring 5, the adjustment ring 9, the blade levers 8 and the blade shafts 6 (see FIG. 2, FIG. 4) provides for a guide device which, as well as the turbine housing 2 and the turbine rotor 1, is part of the turbine with variable turbine geometry (VTG) of the turbocharger. By means of this guide device 5, 6, 7, 8, 9, the cross section for the exhaust gas can be influenced.

The adjustment ring 9 as described above is manufactured comprising the steps of d. providing a piece of sheet metal;

e. removing material from the sheet metal, preferably by means of fine blanking, in order to provide a planar intermediate with a number of openings 9 with a closed rim;
f. deforming a portion of the intermediate in a direction perpendicular to a plane of the intermediate in order to provide for an axially protruding bearing stop 10.

Furthermore, steps b and step c are performed on the same tool in one clamping operation. This enhances the throughput and reduces failures. Performing the steps in one clamping operation means that the workpiece is continuously held by some clamping device, hence keeping a defined position of the workpiece.

Steps b and c are performed one after the other in the same tool. A first stage of the tool provides for step b. Then the resulting intermediate, which is of planar or 2-dimensional structure, is being moved to a second stage, or alternatively a different part of the tool is moved towards the intermediate in one clamping operation.

Then the deforming of the portion of the intermediate, which is the bridge of the closed rim of the opening 9a, is performed in the second stage. The deformed bridges are the bearing stops 10. It is understood that all of the bridges of one intermediate/adjustment ring are deformed simultaneously into the bearings stops 10 in the same operation.

REFERENCE LIST 1 turbine rotor
2 turbine housing
3 compressor device
4 shaft
5 blade bearing ring
5a cylindrical surface
6 blade shaft
7 guide blade
8 blade lever
8a lever head
8b flat surface of blade lever
9 adjustment ring
9a opening in adjustment ring
9b sidewall of opening
10 bearing stop
A turbine axis

The invention claimed is:

1. A method for manufacturing an adjustment ring for adjusting guide blades of a turbocharger with a variable turbine geometry including a turbine (1, 2, 5, 6, 7, 8, 9) with a turbine rotor (1) which is rotatably mounted in a turbine housing (2);
the turbine (1, 2, 5, 6, 7, 8, 9) comprising a blade bearing ring (5) being arranged about a turbine axis (A);
wherein the blade bearing ring (5) supports a number of blade shafts (6);
wherein a plurality of adjustable guide blades (7) are arranged at the blade shafts (6) on a front side of the blade bearing ring (5);
wherein a plurality of blade levers (8) are arranged at the blade shafts (6) on a rear side of the blade bearing ring (5);
wherein an adjustment ring (9) is arranged coaxially with the blade bearing ring (5) and engages with the blade levers (8), a rotation of the adjustment ring (9) relative to the blade bearing ring (5) providing for an adjustment of the guide blades (7);
characterized in that,
the adjustment ring (9) comprises at least one axially protruding bearing stop (10), the bearing stop (10) being provided by deformation of the adjustment ring (9),
the method comprising the steps of:
a. providing a piece of sheet metal;
b. removing material from the sheet metal in order to provide a planar intermediate with a number of openings (9a) with a closed rim;
c. deforming a portion of the intermediate in a direction perpendicular to a plane of the intermediate in order to provide for an axially protruding bearing stop (10).

2. The method according to claim 1, characterized in that the bearing stop (10) abuts against a face (8b) of one of the blade levers (8), wherein a plain bearing arrangement is provided for a relative movement of the adjustment ring (9) and the blade lever (8).

3. The method according to claim 1, characterized in that the adjustment ring (9) is manufactured from a sheet of metal.

4. The method according to claim 1, wherein removing material from the sheet metal is further defined as removing material from the sheet metal by means of fine blanking.

5. The method according to claim 1, characterized in that the bearing stops (10) are formed as an axially directed deformation of a bridge, the bridge being provided at the adjustment ring (9) by means of removing material.

6. The method according to claim 5, characterized in that the bearing stops (10) are formed as the axially directed deformation of a bridge, in a V-shaped or U-shaped manner.

7. The method according to claim 1, characterized in that the adjustment ring (9) is supported in openings (9a) with a closed rim by means of the lever heads (8a) of the blade levers (8).

8. The method according to claim 7, characterized in that the opening (9a) is manufactured by means of fine blanking.

9. The method according to claim 7, characterized in that the axially protruding bearing stop (10) is provided as a deformation of a portion of the closed rim of the opening (9a).

10. The method according to claim 1, characterized in that step b and step c are performed on the same tool.

11. The method according to claim 10, characterized in that step b and step c are performed in one clamping operation.

* * * * *